US010321298B2

(12) United States Patent
Butler et al.

(10) Patent No.: US 10,321,298 B2
(45) Date of Patent: Jun. 11, 2019

(54) SELECTION OF PREFERRED MECHANISMS FOR TELEPHONE NUMBER VALIDATION

(71) Applicant: Apple Inc., Cupertino, CA (US)

(72) Inventors: Robert D. Butler, Middletown, DE (US); Ryan W. Baker, Los Altos, CA (US); Daniel B. Pollack, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/815,902

(22) Filed: Nov. 17, 2017

(65) Prior Publication Data

US 2018/0352417 A1 Dec. 6, 2018

Related U.S. Application Data

(60) Provisional application No. 62/514,824, filed on Jun. 3, 2017.

(51) Int. Cl.
*H04W 8/04* (2009.01)
*H04L 29/06* (2006.01)
(Continued)

(52) U.S. Cl.
CPC ............ *H04W 8/04* (2013.01); *H04L 63/08* (2013.01); *H04L 63/205* (2013.01); *H04W 4/14* (2013.01);
(Continued)

(58) Field of Classification Search
CPC .... G06Q 20/4014; G06Q 20/40; G06Q 20/00; G06Q 20/10; G06Q 20/3224; G06Q 20/425; G06Q 30/0201; G06Q 20/3821; G06Q 20/401; G06Q 20/42; G06Q 20/32; G06Q 20/3223; G06Q 20/16; G06Q 20/305; H04L 63/18; H04L 63/0815; H04L 63/20;
(Continued)

(56) References Cited

U.S. PATENT DOCUMENTS 9,727,715 B2 8/2017 Boodaei
2004/0203599 A1* 10/2004 Miller ................. H04L 63/126
455/411

(Continued)

*Primary Examiner* — Nimesh Patel
(74) *Attorney, Agent, or Firm* — Meyertons Hood Kivlin Kowert and Goetzel PC; Jeffrey C. Hood; Matthew C. Washburn

(57) ABSTRACT

Systems and methods are disclosed for validating an association of a telephone number with a cellular communication device (e.g., validating an assignment of an MSISDN to an IMSI of the cellular communication device). For example, the validating may be performed as part of a process of registering the cellular communication device with a registration server for participation in online communication sessions. In other examples, the validation may be performed for purposes other than registration for participation in online communication sessions. Various mechanisms may be available for performing the validation. The registration server may determine the available mechanisms, and may provide to the cellular communication device an ordered list of mechanisms according to a preferred order. The cellular communication device may improve efficiency of validation by attempting the mechanisms in the preferred order.

19 Claims, 8 Drawing Sheets

(51) Int. Cl.
　　　*H04W 12/06* 　　(2009.01)
　　　*H04W 4/14* 　　(2009.01)
　　　*H04W 88/18* 　　(2009.01)

(52) U.S. Cl.
　　CPC ....... *H04W 12/06* (2013.01); *H04L 2463/082* (2013.01); *H04W 88/184* (2013.01)

(58) Field of Classification Search
　　CPC ..... H04L 63/08; H04L 63/10; H04L 63/0853; H04L 63/205; H04L 67/02; H04L 63/0892; H04L 63/0435; H04L 63/045; H04W 12/06; H04W 12/04; H04W 4/02; H04W 4/21; H04W 4/80; H04W 8/12; H04W 60/00; H04W 8/06; H04W 88/16; H04W 8/08; H04W 80/00; H04W 8/04; H04W 8/26; H04W 12/08; H04W 60/005; H04W 60/04; H04W 36/24; H04W 40/20; H04W 4/00; H04W 84/12; H04W 80/04; H04W 8/02; H04W 12/02; H04W 12/12; H04W 8/245; H04W 36/0038; H04W 48/18; H04W 4/14; H04W 4/60; G06F 17/30752; G06F 21/32; G06F 17/30699; G06F 17/30126; G06F 17/30389; G06F 17/30029; G06F 21/31; G06F 21/36; G06F 21/46; G06F 3/0484; G06F 21/35; G06F 21/40; G06F 21/74; G06F 2221/2139
　　See application file for complete search history.

(56) References Cited

U.S. PATENT DOCUMENTS

| | | | |
|---|---|---|---|
| 2008/0209213 A1* | 8/2008 | Astrand | H04L 63/083 713/168 |
| 2010/0100945 A1* | 4/2010 | Ozzie | G06F 21/35 726/5 |
| 2012/0003957 A1* | 1/2012 | Agevik | H04L 63/126 455/410 |
| 2013/0336240 A1* | 12/2013 | Cherian | H04W 12/06 370/329 |
| 2016/0381549 A1 | 12/2016 | Lam et al. | |
| 2017/0171216 A1* | 6/2017 | Chhabra | H04L 63/105 |

* cited by examiner

SELECTION OF PREFERRED MECHANISMS FOR TELEPHONE NUMBER VALIDATION

PRIORITY INFORMATION

This application claims priority to U.S. provisional patent application Ser. No. 62/514,824, titled "Selection of Preferred Mechanisms for Telephone Number Validation," by Robert D. Butler, et al., filed Jun. 3, 2017, which is hereby incorporated by reference in its entirety as though fully and completely set forth herein.

FIELD

The present application relates to wireless communication, including efficiently validating an association of a telephone number with a cellular communication device.

DESCRIPTION OF THE RELATED ART

Wireless communication systems are rapidly growing in usage. Further, wireless communication technology has evolved from voice-only communications to also include the transmission of data, such as Internet and multimedia content.

Many wireless communication devices may be cellular communication devices associated with a telephone number; e.g., a cellular communication device may include a SIM, to which a telephone number has been assigned. Validation of this association may be important in various communications applications.

For example, systems may be implemented for performing communication sessions online, rather than via traditional cellular voice or SMS channels. A user of a first communication device may send a communication to a user of a second communication device via an online communication session, by addressing the communication to a telephone number associated with the second communication device. However, the communication may not be routed to the second communication device via traditional telephone addressing channels. Instead, the message may be transmitted from the first communication device to an identification server, which may identify a user account associated with the telephone number and route the text message as an IP message to one or more devices associated with the user account, such as the second communication device.

However, prior to utilizing a telephone number for connecting communications to a cellular communication device, the identification server may determine that the telephone number is associated with the cellular communication device. This determination may be important, e.g., to prevent a malicious party from spoofing the telephone number and intercepting sensitive communications. Therefore, this association may be validated as part of a process of registering the cellular communication device to operate with the identification server.

However, procedures for validating associated telephone numbers may incur costs for operators of validating entities. It would therefore be desirable to improve efficiency and reduce cost associated with these procedures.

SUMMARY

Systems and methods are disclosed for intelligently and dynamically selecting methods of validating an association of a telephone number with a cellular communication device, e.g., to improve efficiency and/or reduce cost. Various mechanisms may be available for performing the validation. A registration server may determine available mechanisms, and may provide to the cellular communication device an ordered list of mechanisms, e.g., according to a preferred order. The cellular communication device may improve efficiency of validation by attempting the mechanisms in the specified order.

For example, according to a method for selecting a validation mechanism for association of a telephone number with a user equipment device (UE), the UE may transmit a mechanism-request message (e.g., an internet protocol (IP) message) including an indication that the UE intends to request validation of the association by a registration server. Validating the association may, e.g., include validating that an MSISDN has been assigned to an IMSI of the UE. The UE may further receive, responsive to the mechanism-request message, an ordered list of mechanisms for validating the association. The UE may further select a first mechanism of the ordered list of mechanisms, based on the list order, and attempt the first mechanism of the ordered list of mechanisms.

If validation is successful, the UE may receive from the registration server a confirmation that the association has been validated by the registration server.

If validation is not successful through the first mechanism, the UE may attempt one or more subsequent mechanisms of the ordered list of mechanisms. For example, in some scenarios, the UE may determine that validation of the association according to the first mechanism has failed, and attempt a second mechanism of the ordered list of mechanisms in response to the determining. In some scenarios, determining that validation of the association according to the first mechanism has failed may include determining that the UE has not received a confirmation that the association has been validated within a predetermined time after attempting the first mechanism. This may be iteratively repeated, e.g., until the UE determines that validation has succeeded.

Alternatively, the UE may determine that validation has failed. For example, the UE may attempt each mechanism of the ordered list of mechanisms, and determine that validation of the association has failed for each mechanism of the ordered list of mechanisms. In response to determining that validation has failed, the UE may transmit an updated mechanism-request message comprising an indication that the UE intends to request validation of the association by the registration server. The UE may then receive, responsive to the updated mechanism-request message, an updated ordered list of mechanisms for validating the association. The UE may again attempt to validate the association by attempting one or more mechanisms of the updated ordered list.

In some scenarios, the UE may retransmit the mechanism-request message responsive to determining that the ordered list has not been received within a predetermined duration after transmitting the mechanism-request message, wherein the UE delays attempting any mechanism for validating the association until after receiving the ordered list.

The method may further include requesting registration of the UE with the registration server for participation in online communication sessions. The UE may further receive from the registration server a confirmation that the UE has been registered with the registration server.

As another example, according to a method for validating an association of a telephone number with a user equipment device (UE) by a registration server, the registration server may receive from the UE a mechanism-request message (e.g., an Internet Protocol (IP) message) including an indication that the UE intends to request validation of the association by the registration server. The registration server may further generate, in response to receiving the mechanism-request message, an ordered list of mechanisms for attempting to validate the association, and may transmit the ordered list to the UE. The registration server may receive from the UE a validation request according to a particular mechanism of the mechanisms included on the ordered list, and may validate the association of the telephone number with the UE according to the particular mechanism in response to receiving the validation request. The registration server may transmit to the UE a confirmation that the association has been validated.

In some scenarios, generating the ordered list of mechanisms may include ordering available mechanisms in order of increasing cost to an operator of the registration server. In some scenarios, generating the ordered list of mechanisms may include ordering available mechanisms in order of decreasing likelihood of successful validation. In some scenarios, generating the ordered list of mechanisms may include ordering available mechanisms in an order considering both cost to an operator of the registration server and likelihood of successful validation.

In some scenarios, a mechanism of the ordered list, such as the particular mechanism, may include validating the telephone number of the UE using an entitlement server. Additionally, or alternatively, a mechanism of the ordered list, such as the particular mechanism, may include validating the telephone number of the UE by verifying that a short message service (SMS) network serving the UE delivers to the UE an SMS message addressed to the telephone number. In some such scenarios, the mechanism may further include routing the SMS message via a particular SMS transit device of a plurality of available SMS transit devices.

The method may further include registering the UE, in response to validating the association, for participation in online communication sessions, wherein registering the UE comprises storing information associating the telephone number with the UE.

In other examples, other applications, such as online payment applications, may also benefit from validation of the association of a telephone number with a cellular communication device.

Apparatuses for performing any of the preceding methods are also disclosed.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
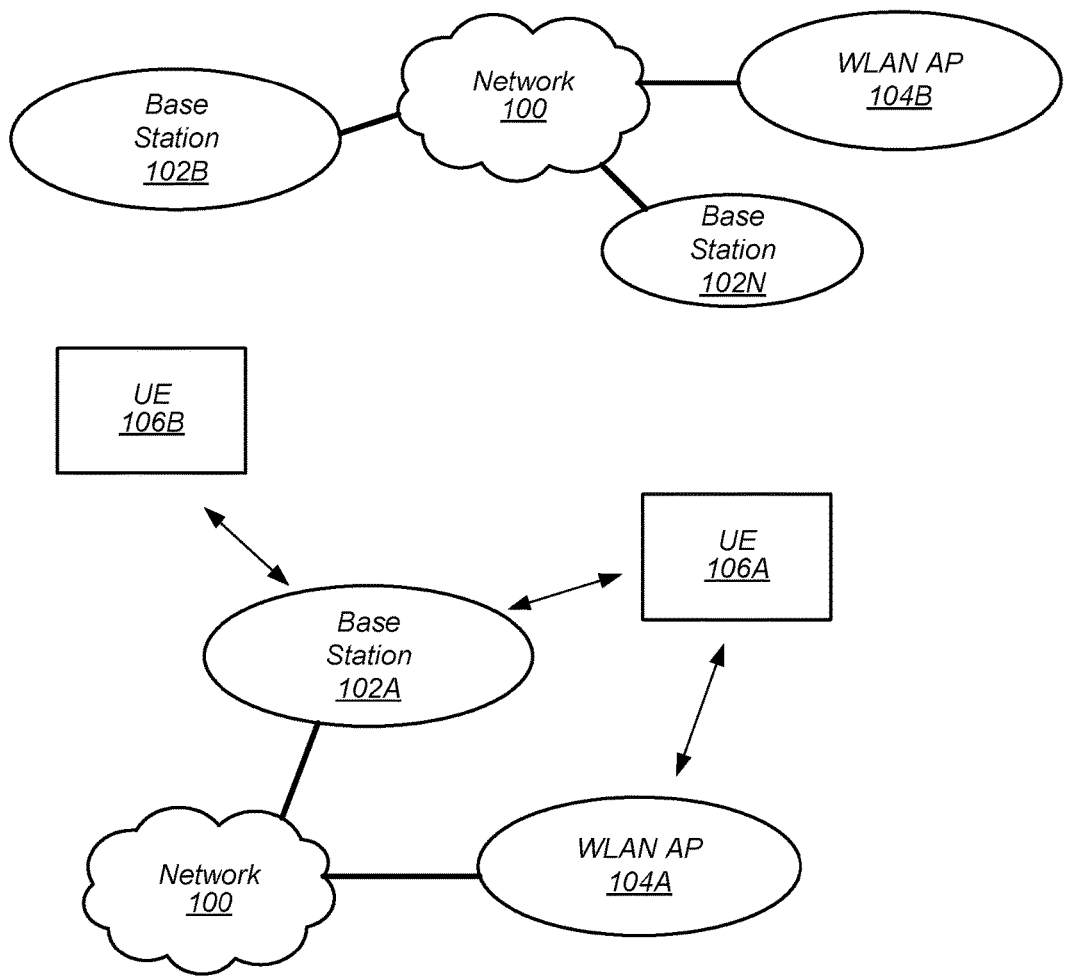
FIG. 1 illustrates an exemplary (and simplified) wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION

Incorporation by Reference

The following documents contain subject matter relevant to the present disclosure, and are hereby incorporated by reference as if fully and completely disclosed herein.
U.S. Pat. No. 8,423,058
3GPP TS 23.040, Version 14.0.0

Acronyms

The following acronyms are used in this disclosure.
3GPP: Third Generation Partnership Project 3GPP2: Third Generation Partnership Project 2
GSM: Global System for Mobile Communications
ICC-ID: Integrated Circuit Card Identifier
IP: Internet Protocol
ISDN: Integrated Services Digital Network
LTE: Long Term Evolution
LTE-A: LTE-Advanced
MMS: Multimedia Message Service
MSISDN: Mobile Subscriber ISDN Number
SIM: Subscriber Identity Module
SMS: Short Message Service
SMSC: Short Message Service Center
UMTS: Universal Mobile Telecommunications System
WLAN: Wireless Local Area Network Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices including multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless cellular communication system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Figure 2:
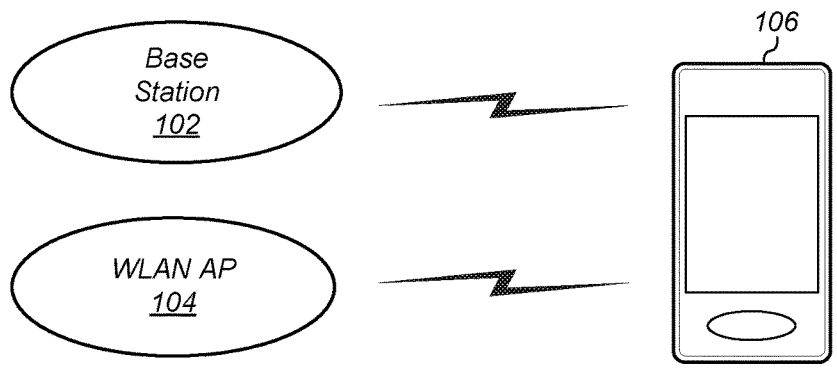
FIG. 2 illustrates an example of a base station (BS) and a wireless local area network access point (WLAN AP) in communication with a user equipment (UE) device, according to some embodiments.

FIGS. 1-2—Wireless Communication System

FIG. 1 illustrates an exemplary (and simplified) wireless communication scenario involving multiple communication systems. It is noted that FIG. 1 is merely one example of possible systems, and embodiments disclosed herein may be implemented in any of various systems, as desired.

As shown, the exemplary wireless communication scenario includes a cellular communication system represented by base station 102A and a wireless local area network (WLAN) represented by access point (AP) 104A.

The cellular communication system includes a base station 102A which communicates over a transmission medium with one or more user devices 106A, 106B, etc. Each of the user devices 106 may be referred to herein as a "user equipment" (UE). Thus, the user devices 106 are referred to as UEs or UE devices. Only two UE devices 106A and 106B are shown in FIG. 1 for ease of illustration.

The base station 102A may be a base transceiver station (BTS) or cell site, and may include hardware that enables wireless communication with the UEs 106A and 106B. The base station 102A may also be equipped to communicate with a network 100 (e.g., a core network of a cellular service provider, a telecommunication network such as a public switched telephone network (PSTN), a WLAN, and/or the Internet, among various possibilities). Thus, the base station 102A may facilitate communication between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), WiMAX, etc.

Base station 102A and other similar base stations (such as base stations 102B . . . 102N) operating according to the same or a different cellular communication standard may thus be provided as a network of cells, which may provide continuous or nearly continuous overlapping service to UEs 106A-B and similar devices over a wide geographic area via one or more cellular communication standards.

Thus, while base station 102A may act as a "serving cell" for UEs 106A-B as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100.

In addition to communicating with base station 102A, one or more of the UEs 106 may also be capable of communicating with a WLAN AP 104A, also known as a "hotspot." Thus, the WLAN AP 104A may facilitate communication between the devices and the network 100. The WLAN AP 104A and the UEs 106 may be configured to communicate over the transmission medium using any of various RATs, such as Wi-Fi, etc.

UEs 106 may be capable of dynamically transitioning between communicating with base station 102A over the cellular network and WLAN AP 104A over the WLAN. For example, UE 106A may, while in communication with base station 102A, perform seamless and/or non-seamless offload for some IP flows to WLAN AP 104A. Thus, for example, if the user is conducting a browsing session, the data packets may initially be conveyed over the cellular network over LTE. However, the UE 106A may at some point decide to offload some or all of the data packets onto the WLAN through WLAN AP 104A.

FIG. 2 illustrates user equipment (UE) 106 (e.g., one of the devices 106A or 106B) in communication with a base station 102 (e.g., one of the base stations 102A through 102N) for communication on a cellular network and a WLAN AP 104 (e.g., one of the WLAN APs 104A through 104B) for communication on a WLAN. The UE 106 may be a device with cellular communication capability and WLAN communication capability, such as a mobile phone, a handheld device, a computer or a tablet, or virtually any type of wireless device, as defined above.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple cellular RATs. For example, the UE 106 may be configured to communicate using one or more of GSM, CDMA2000, LTE, or LTE-A. The UE 106 may also be capable of communication over a WLAN. Other combinations of wireless communication technologies are also possible.

Figure 3:
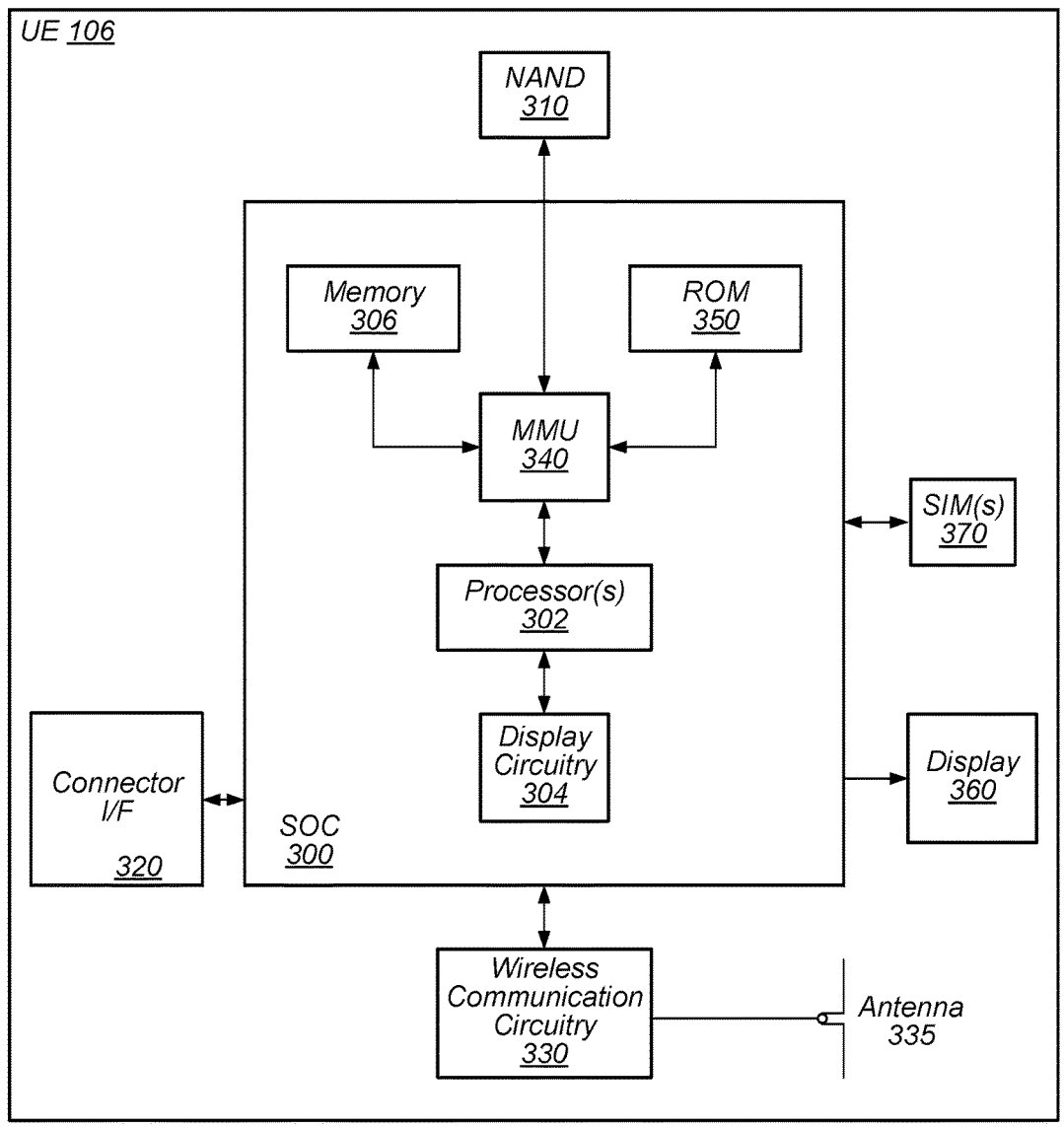
FIG. 3 is a block diagram illustrating an example UE device, according to some embodiments.

FIG. 3—Example Block Diagram of a UE

FIG. 3 illustrates one possible block diagram of a UE 106. As shown, the UE 106 may include a system on chip (SOC) 300, which may include portions for various purposes. For example, as shown, the SOC 300 may include processor(s) 302 which may execute program instructions for the UE 106, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310). The MMU 340 may be configured to perform memory protection and page table translation or set up. In some embodiments, the MMU 340 may be included as a portion of the processor(s) 302.

The UE 106 may also include other circuits or devices, such as the display circuitry 304, wireless communication circuitry 330, connector interface (I/F) 320, and/or display 340. The UE 106 may further include one or more smart cards 370 that include SIM (Subscriber Identity Module) functionality, such as one or more UICC(s) (Universal Integrated Circuit Card(s)).

In the embodiment shown, ROM 350 may include a bootloader, which may be executed by the processor(s) 302 during boot up or initialization. As also shown, the SOC 300 may be coupled to various other circuits of the UE 106. For example, the UE 106 may include various types of memory, a connector interface 320 (e.g., for coupling to a computer system), the display 360, and wireless communication circuitry 330 (e.g., for communication using LTE, CDMA2000, Bluetooth, Wi-Fi, NFC, GPS, etc.).

The UE 106 may include at least one antenna, and in some embodiments multiple antennas, for performing wireless communication with base stations and/or other devices. For example, the UE 106 may use antenna 335 to perform the wireless communication. As noted above, the UE may in some embodiments be configured to communicate wirelessly using a plurality of wireless communication standards or radio access technologies (RATs).

As noted above, the UE 106 may include at least one smart card 370, such as a UICC, which executes one or more Subscriber Identity Module (SIM) applications and/or otherwise implements SIM functionality. The at least one smart card 370 may be only a single smart card 370, or the UE 106 may include two or more smart cards 370.

As described herein, the UE 106 may include hardware and software components (and/or other means) for implementing methods according to embodiments of this disclosure. For example, the UE 106 may include hardware and software components (and/or other means) for implementing features for transmitting and receiving short message system (SMS) messages as well as sending/receiving IP messages, such as those described herein with reference to, inter alfa, FIGS. 5-8. The processor 302 of the UE 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

It is noted that the UEs 106A and 106B shown in FIG. 1 may have a similar architecture to that described above.

Figure 4:
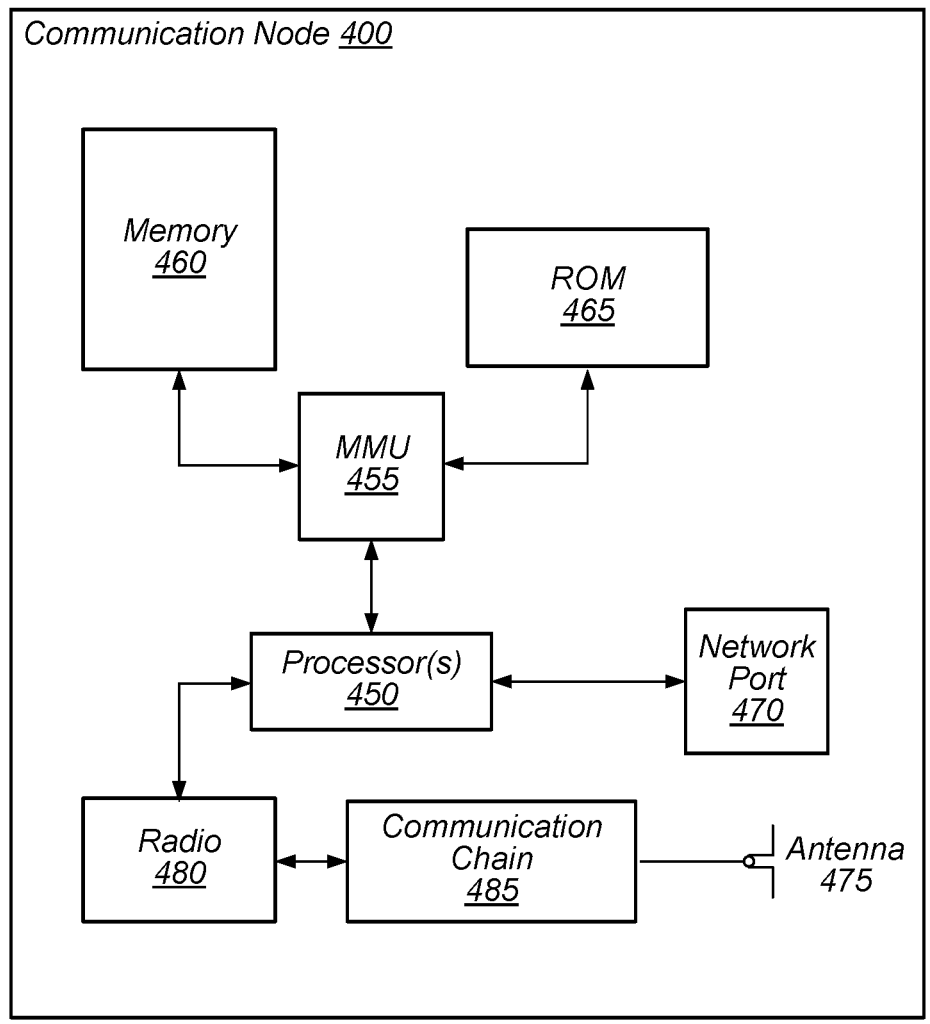
FIG. 4 is a block diagram illustrating an example base station, according to some embodiments.

FIG. 4—Example Block Diagram of a Base Station

FIG. 4 illustrates an exemplary block diagram of a communication node 400. In various embodiments, the communication node 400 may represent either a base station 102 or a WLAN AP 104. It is noted that the communication node of FIG. 4 is merely one example of a possible communication node. As shown, the communication node 400 may include processor(s) 450 which may execute program instructions for the communication node 400. The processor(s) 450 may also be coupled to memory management unit (MMU) 455, which may be configured to receive addresses from the processor(s) 450 and translate those addresses to locations in memory (e.g., memory 460 and read only memory (ROM) 465) or to other circuits or devices.

The communication node 400 may include at least one network port 470. The network port 470 may be configured to couple to a telephone network and provide a plurality of devices, such as the UE 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106 and the secondary wireless device 107. In some cases, the network port 470 may couple to a telephone network via the core network, and/or the core network may provide a telephone network (e.g., among other UE devices serviced by the cellular service provider).

The network port 470 (or an additional network port) may also or alternatively be configured to couple to a local network, such as a home network or an enterprise network. For example, port 470 may be an Ethernet port. The local network may provide connectivity to additional networks, such as the Internet.

The communication node 400 may include at least one antenna 475, and possibly multiple antennas. The at least one antenna 475 may be configured to operate as a wireless transceiver and may be further configured to communicate with the UE 106 via radio 480. The antenna 475 communicates with the radio 480 via communication chain 485. Communication chain 485 may be a receive chain, a transmit chain or both. The radio 480 may be configured to communicate via various wireless telecommunication standards, including, but not limited to, LTE, LTE-A, UMTS, CDMA2000, etc.

As described further subsequently herein, the communication node 400 may include hardware and software components (and/or other means) for implementing features described herein. The processor 450 of the communication node 400 may be configured to implement part or all of the methods described herein, e.g., by executing program instructions stored on a memory medium (e.g., a non-transitory computer-readable memory medium). Alternatively, the processor 450 may be configured as a programmable hardware element, such as an FPGA (Field Programmable Gate Array), or as an ASIC (Application Specific Integrated Circuit), or a combination thereof. Alternatively (or in addition), the processor 450 of the communication node 400, in conjunction with one or more of the other components 455, 460, 465, 470, 475, 480, 485 may be configured to implement part or all of the features described herein, such as the features described herein.

Telephone Number Validation

Cellular communication devices may be associated with a telephone number. For example, a cellular communication device may include a SIM, to which a telephone number (e.g., Mobile Subscriber ISDN Number (MSISDN)) has been assigned (e.g., by a cellular communication service provider). Validation of this association may be important in various communications applications. The process of validating this association may be referred to herein as telephone number validation or validation.

For example, systems may be implemented for delivering communications, such as text message, multimedia messages, voice calls, etc., to mobile devices via data connections, rather than via traditional cellular voice or SMS channels. For example, a user of a first communication device, such as the UE 106A, may send a text message or multimedia message to a user of a second communication device, such as the UE 106B, via a messaging application (e.g., Messages™ by Apple Inc.) by addressing the text message to a telephone number (e.g., to an MSISDN or portion thereof) associated with the second communication device. However, the text message may not be delivered to the second communication device via cellular SMS channels, such as via a short message service center (SMSC). Instead, the message may be transmitted from the first communication device to an identification server, which may identify a user account associated with the telephone number and route the text message as an IP message to one or more devices associated with the user account, such as the second communication device. The text message may thus be delivered, e.g., over a cellular data connection, a WLAN, or another network, based on various factors, such as network availability and user preference.

Such online communication sessions may provide numerous benefits both to cellular service providers and to users, such as decongestion of cellular communication networks, improved reliability of communications where cellular coverage is poor (below a reliability threshold) or absent, and cost savings. It may also allow the messages to be automatically forwarded to one or more secondary devices owned by the same user (e.g., registered to the same user account) as the second communication device, such as to a laptop or desktop computer, a tablet computer, a set-top box, and/or a wearable device, such as a smart watch.

Voice and/or video calls, as well as other forms of communication, may similarly benefit from an online communication session format. For example, using an audio/video communication application (e.g., FaceTime™ by Apple Inc.), a voice and/or video call may be addressed using a telephone number assigned to a cellular communication device, but may be directed through the identification server, which may identify a user account associated with the telephone number and route the call via an IP connection to one or more devices associated with the user account, such as the cellular communication device. Thus, the telephone number of the cellular communication device may be used to address the call, even when the call is routed via IP pathways, rather than via telephone circuits.

However, prior to utilizing a telephone number for connecting communications to a cellular communication device (or to another device associated with the same user account), the identification server may determine that the telephone number is associated with (e.g., assigned to) the cellular communication device. For example, the identification server may verify that the telephone number (e.g., MSISDN or portion thereof) has been assigned to a SIM (or to an IMSI associated with the SIM) of the cellular communication device. This determination may be important, e.g., to prevent a malicious party from spoofing the telephone number and intercepting sensitive communications. Therefore, this association may be validated as part of a process of registering the cellular communication device to operate with the identification server. Such registration may occur automatically in response to an event at the cellular communication device, such as when the cellular communication device powers on or is configured to utilize an associated application (such as Messages™ or FaceTime™). In other scenarios, this registration may be initiated explicitly by a user. This registration and validation process may be referred to herein as telephone number registration.

In other examples, other applications, such as online payment applications, may also benefit from validation of the association of a telephone number with a cellular communication device.

In some scenarios, telephone number validation may be performed automatically, e.g., as part of a process of telephone number registration, or in response to initiation or configuration of another application, such as an application utilizing an online payment functionality. In other scenarios, telephone number validation may be initiated explicitly by a user.

In some scenarios, telephone number validation and/or telephone number registration may be performed by a registration server associated with the identification server. For example, the registration server may be included in the identification server, collocated with the identification server, or operated by the same party as the identification server. The registration server may validate the association of the telephone number with the cellular communication device. If the association is validated, the registration server may communicate the validation, or the validated data, available to applicable entities. For example, in some scenarios, the registration server may store registration data (e.g., internally, or in a separate registration data store), which may include information associating the telephone number with the cellular communication device. The identification server may access this stored data, or otherwise receive such data from the registration server, to determine that a phone number is associated with a cellular communication device. As another example, the registration server may provide a certificate or other information confirming the association to an application or server involved in, e.g., online payments.

The association of the telephone number with the cellular communication device may be validated by the registration server in various ways. Notably, a cellular carrier network to which the cellular communication device is subscribed may maintain secure data identifying the cellular communication device to which the telephone number is assigned, such as a serial number of the device, an ICC-ID (Integrated Circuit Card ID) of a SIM (Subscriber Identity Module) card of the device, etc. Because this information is secure, the registration server may trust such information communicated from the cellular carrier network in a secure manner. Thus, the registration server may leverage this secure identification information stored by the carrier network to perform telephone number validation.

Telephone Number Validation Using SMS Delivery

In some scenarios, a registration server may indirectly leverage the fact that the cellular network maintains secure information associating telephone numbers with cellular communication devices. For example, telephone number validation may be performed by addressing one or more communication messages, such as SMS messages, to a telephone number believed to be assigned to a cellular communication device, such as the UE 106, via a cellular network. Delivery to the UE 106 of the SMS message addressed to the telephone number may validate that the telephone number is assigned to the UE 106.

Figure 5:
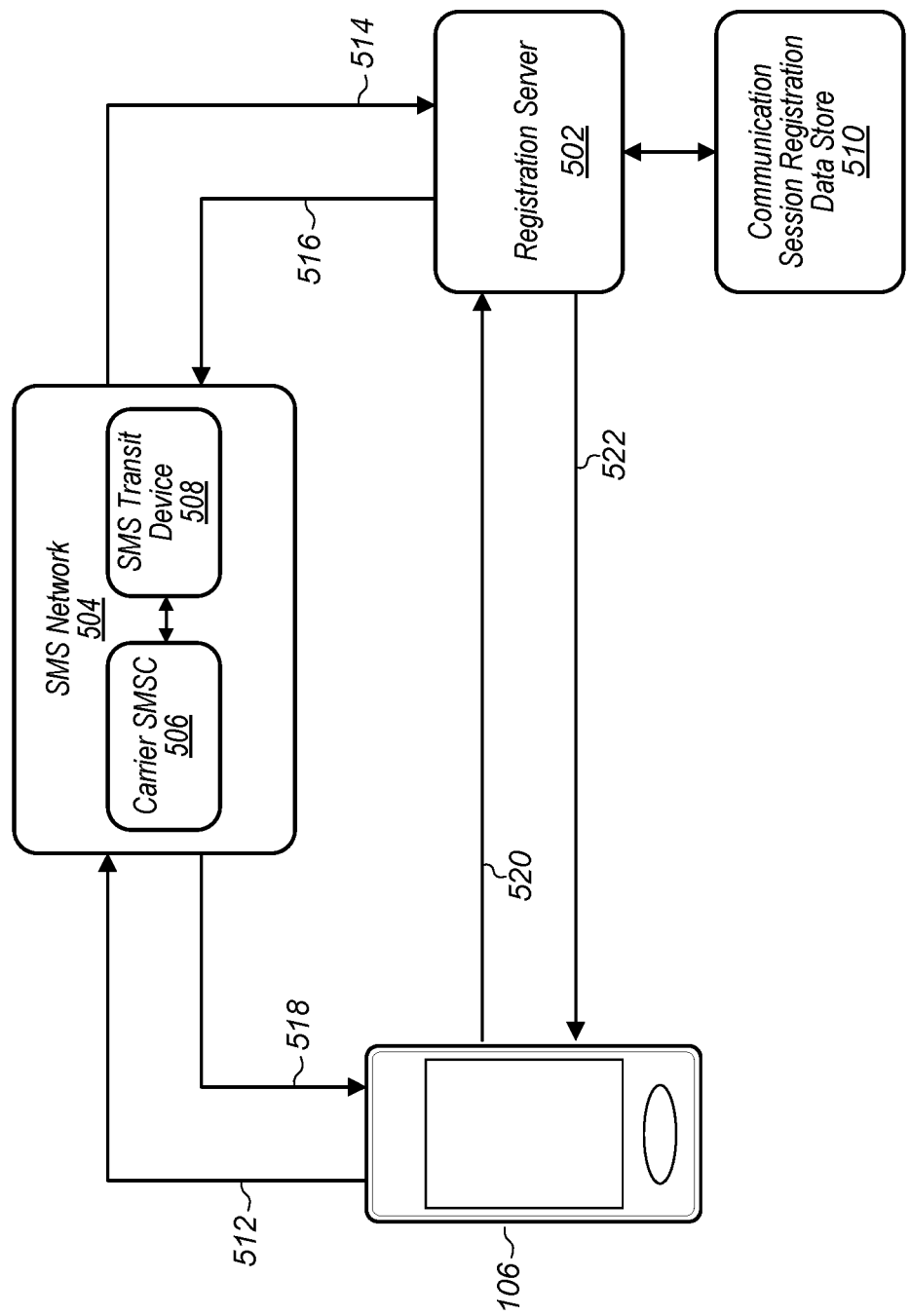
FIG. 5 is a block diagram illustrating an example of a system for automatically registering a UE device with a registration server for online communication sessions, by utilizing SMS messages, according to some embodiments.

FIG. 5 illustrates an example of a system and method for automatically performing telephone number validation by utilizing SMS messages, according to some embodiments.

As shown in FIG. 5, a cellular communication device, such as the UE 106, may communicate with a registration server 502 via an SMS network 504. The UE 106 may further communicate with the registration server by sending and/or receiving one or more IP messages, e.g., via a cellular network, a WLAN, or some other network capable of supporting IP communications. In some implementations, one or more other protocols can be used in place of or in addition to IP communications. The SMS network 504 may include a carrier SMSC (Short Message Service Center) 506 and an SMS transit device 508 (e.g., an SMS gateway, an SMS aggregator, or some other SMS provider or vendor). The SMS network 504 may further include one or more base stations, such as the BS 102 (not shown), to enable cellular communication between the UE 106 and the Carrier SMSC 506. The carrier SMSC 506 may be carrier-specific and may receive and deliver SMS messages. For example, the carrier SMSC 506 may deliver SMS messages sent from the UE 106 to the SMS transit device 508, and may deliver SMS messages sent from the SMS transit device 508 to the UE 106. The SMS transit device 508 may separate the mobile network and the IP network. In some scenarios, the SMS transit device 508 may be operated by a third party, outside of the SMS network 504. In some scenarios, more than one SMS transit device 508 may be present.

As shown in FIG. 5, the UE 106 may transmit an SMS message 512 (e.g., an SMS-SUBMIT TPDU) including an identifying token (e.g., a push token) and a UE identifier to the SMS transit device 508 via the carrier SMSC 506. In some embodiments, the SMS message 512 may be addressed to a telephone number that is specifically established for online communication session registration. In embodiments where more than one SMS transit device 508 is present, the telephone number to which the SMS message 512 is addressed may identify a specific SMS transit device 508.

The identifying token may uniquely identify the UE 106 for online communication session messages (e.g., invite request and accept invite messages), and in some embodiments, may be a push token that can contain information that allows a push notification service to locate the UE 106. The identifying token in push notification service embodiments may also be used as a way of establishing trust that a particular notification is legitimate. In other embodiments, any registry or mapping of UEs to unique tokens may be used to associate identifying tokens with UEs and to provide a trusted method of associating the identity of the UE 106 with a uniquely identified token. The UE identifier may uniquely identify the UE 106 and may be based on one or more hardware identifiers (e.g., a serial number of the UE 106, an ICC-ID of a SIM card of the UE 106, etc.).

The carrier SMSC 506 may receive the SMS message 512 and deliver it (e.g., as an SMS-DELIVER TPDU) to the SMS transit device 508. In response, the SMS transit device 508 may transmit an IP (Internet Protocol) message to the registration server 502 with the identifying token, UE identifier, and the telephone number. This IP message may be referred to as an identification request message 514. In some embodiments, the UE 106 may not natively know its own telephone number. In such embodiments, the SMS transit device 508 may determine the telephone number of the UE 106 (e.g., by examining the header of the SMS message). In other embodiments, the UE 106 may know its own telephone number, and may include the telephone number in the SMS message 512.

In response to receiving the identification request message 514, the registration server 502 may generate a signature based on the identifying token, UE identifier, and/or the telephone number. In some embodiments, a random number may also be used when generating the signature to account for situations where multiple client devices have the same phone number. The registration server 502 may transmit an IP message including the signature, as well as the identifying token, UE identifier, and/or the telephone number, to the SMS transit device 508 for delivery to the UE 106. This IP message may be referred to as a identification response message 516.

In response to receiving the identification response message 516, the SMS transit device 508 may transmit an SMS message 518 addressed to the telephone number, via the carrier SMSC 506. The SMS message 516 may include the signature and telephone number. The carrier SMSC 506 may determine that the telephone number is assigned to the UE 106, and may thus route the SMS message 518 to the UE 106.

The UE 106 may then transmit an IP message to the registration server 502 with the signature, UE identifier, identifying token, and telephone number. This IP message may be referred to as a validation request message 520. In some embodiments, IP communications between the UE 106 and the registration server 502 may be conducted via a cellular base station, such as the BS 102, a WLAN AP, such as the WLAN AP 104, or some other communication access point. Such access points and other network components are implied, but are omitted from the figures for clarity.

The registration server 502 may validate the information from the UE 106. For example, the registration server 502 may compare the signature sent by the UE 106 with the signature transmitted in the registration response message 516. If they match, then the data is validated.

Assuming that the association is validated, the registration server 502 may store an association between the UE 106 (e.g., the identifying token) and the telephone number of the UE 106 in the communication session registration data store 510, e.g., in scenarios in which the UE 106 has requested registration with the registration server 502 for online communication sessions. Such a request may be included, e.g., in the validation request message 520. Together, the associated pair of the identifying token and the phone number uniquely identify the UE 106 in an online communication session network. After the UE 106 has been registered, a user at the UE 106 may initiate and/or accept an invitation for an online communication session (e.g., video chat/conference session, instant messaging session, etc.). In some embodiments, the telephone number of the UE 106 may be used as the online communication session endpoint identifier of an online communication session. By way of example, a user at the UE 106 may invite other user(s) at other client device(s) to participate in an online communication session using their telephone number(s).

In other scenarios, telephone number validation may have been requested for some purpose other than registration for online communication sessions. In such scenarios, the registration server 502 may transmit additional communications (e.g., IP messages) to other entities, and/or may store an association between the UE 106 and the telephone number in locations other than the communication session registration data store 510.

In some embodiments, the registration server 502 may transmit a validation status message 522 (e.g., an IP message) to the UE 106, alerting the UE 106 whether validation was successful. In some embodiments, the validation status message 522 may be transmitted only if validation was successful. In some scenarios, the validation status message 522 may further indicate whether registration was successful. It should be appreciated that FIG. 5 is merely one example of a system and method for performing telephone number validation and registration using SMS messages. Additional embodiments and variations are envisioned. Additional examples are disclosed in U.S. Pat. No. 8,423, 058, which is incorporated by reference above. While the preceding description describes the use of SMS messages during registration, in other embodiments other types of text messaging may be used (e.g., MMS (Multimedia Messaging Service)).

As noted above, in some scenarios, telephone number validation may be performed automatically, e.g., as part of a process of telephone number registration, or in response to initiation or configuration of another application, such as an application utilizing an online payment functionality. In such scenarios, the process may be hidden from, or transparent to, the user of the UE 106. For example, in implementing the procedure illustrated in FIG. 5, the UE may transmit and/or receive SMS messages such as 512 and 518, and/or IP messages such as the validation request message 520 and the validation status message 522, without providing any notification to the user.

Figure 6:
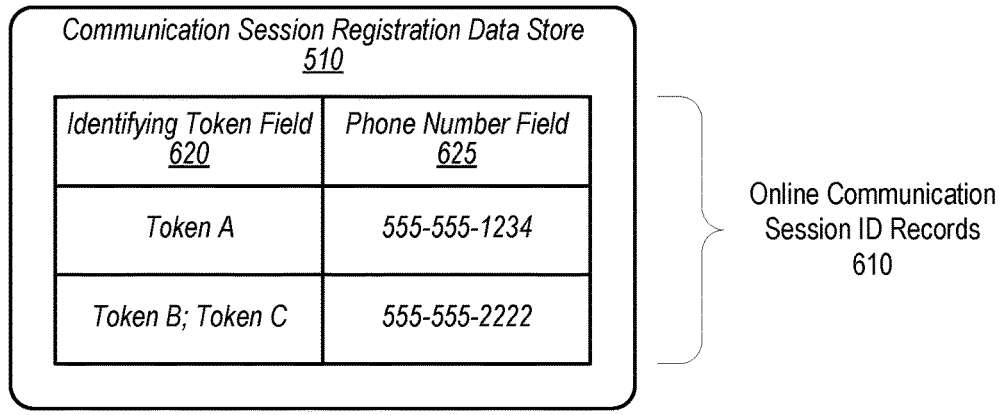
FIG. 6 is a block diagram illustrating an example communication session registration data store, according to some embodiments.

FIG. 6 illustrates an exemplary communication session registration data store 510 according to some embodiments. The communication session registration data store 510 may be included in the registration server 502, or in the identification server, or may be located elsewhere. As illustrated in FIG. 6, each of the online communication session identifier records 610 may include an identifying token field 620 and a phone number field 625. In some situations, it may be possible for a single phone number to be associated with multiple identifying tokens. For example, different client devices may have the same phone number. In these cases, these different client devices would have different identifying tokens. Thus, when an online communication session invitation is sent for a phone number associated with multiple identifying tokens, an invite may be transmitted to each device associated with the identifying token.

Figure 7:
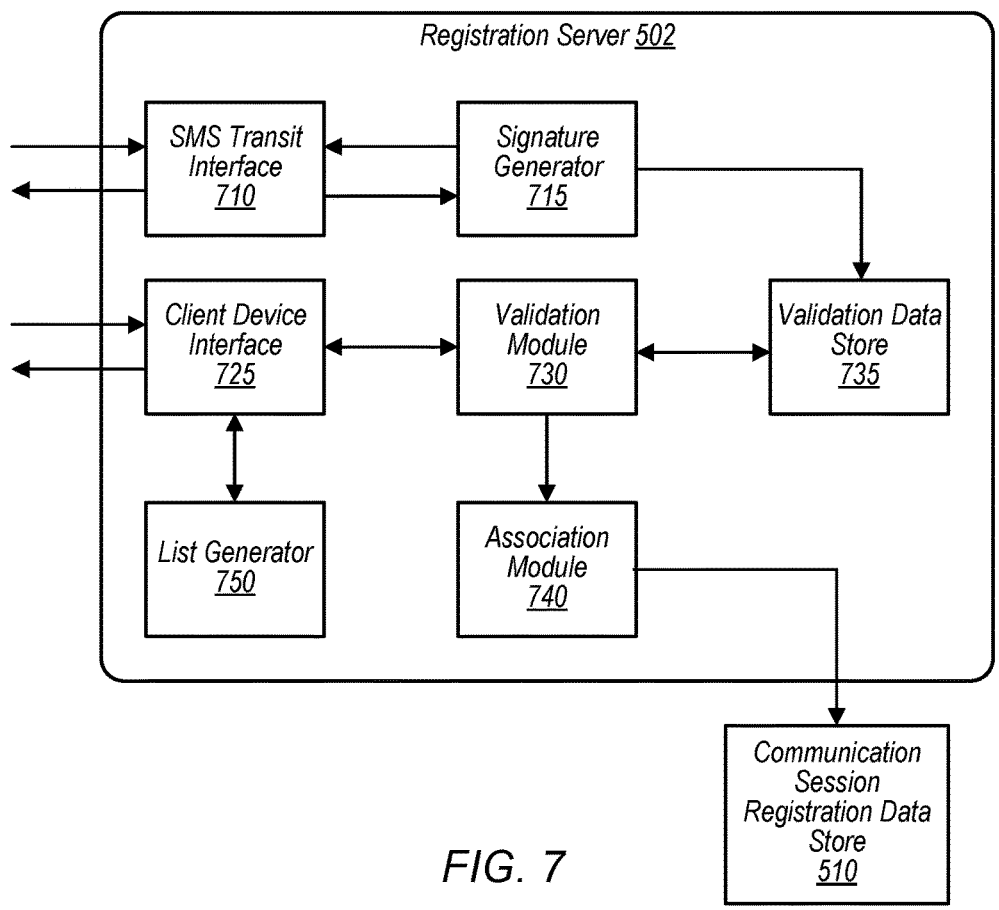
FIG. 7 is a block diagram illustrating an example registration server, according to some embodiments.

FIG. 7 is a block diagram illustrating an example registration server 502 in more detail, according to some embodiments. As illustrated in FIG. 7, the registration server 502 may include an SMS transit interface 710, a signature generator 715, a client device interface 725, a validation module 730, a validation data store 735, and an association module 740.

The SMS transit interface 710 may receive messages from and transmit messages to the SMS transit device 508. For example, the SMS transit interface 710 may receive telephone number, identifying token, and UE identifier tuples from the SMS transit device 508, and may transmit telephone number, identifying token, UE identifier and signature tuples (sometimes referred to as "validation tuples") to the SMS transit device 508. As a specific example, the SMS transit interface 710 may receive the identification request message 514, and may transmit the identification response message 516.

The client device interface 725 may receive messages from and transmit messages to client devices, such as the UE 106. For example, the client device interface 725 may receive the validation request message 520 from the UE 106, and may transmit the validation status message 522 to the UE 106.

The signature generator 715 may generate a signature for the telephone number, identifying token, and UE identifier tuple received in the identification request message 514. In some scenarios, a cryptographic hash may be applied to the telephone number, identifying token, and/or UE identifier, or some portion thereof, to generate the signature. The signature generator 715 may also store the signature and optionally the phone number, identifying token, and/or UE identifier in the validation data store 735.

The validation module 730 may receive from the client device interface 725 the telephone number, identifying token, UE identifier, and signature included in the validation request message 520. The validation module 730 may then determine whether the data is valid. For example, the same hash function as applied when generating the signature may be used on the telephone number, identifying token, and/or UE identifier received from the client device, and the validation module 730 may compare the result with the signature that was previously generated (stored in the validation data store 735). If the signatures match, then the data is presumed valid.

The association module 740 may store an association of the telephone number of the UE 106 and the identifying token of the UE 106 in the communication session registration data store 510. The registration server 502 may further include a list generator 750, which is further discussed below.

Telephone Number Validation Using Entitlement Server

Figure 8:
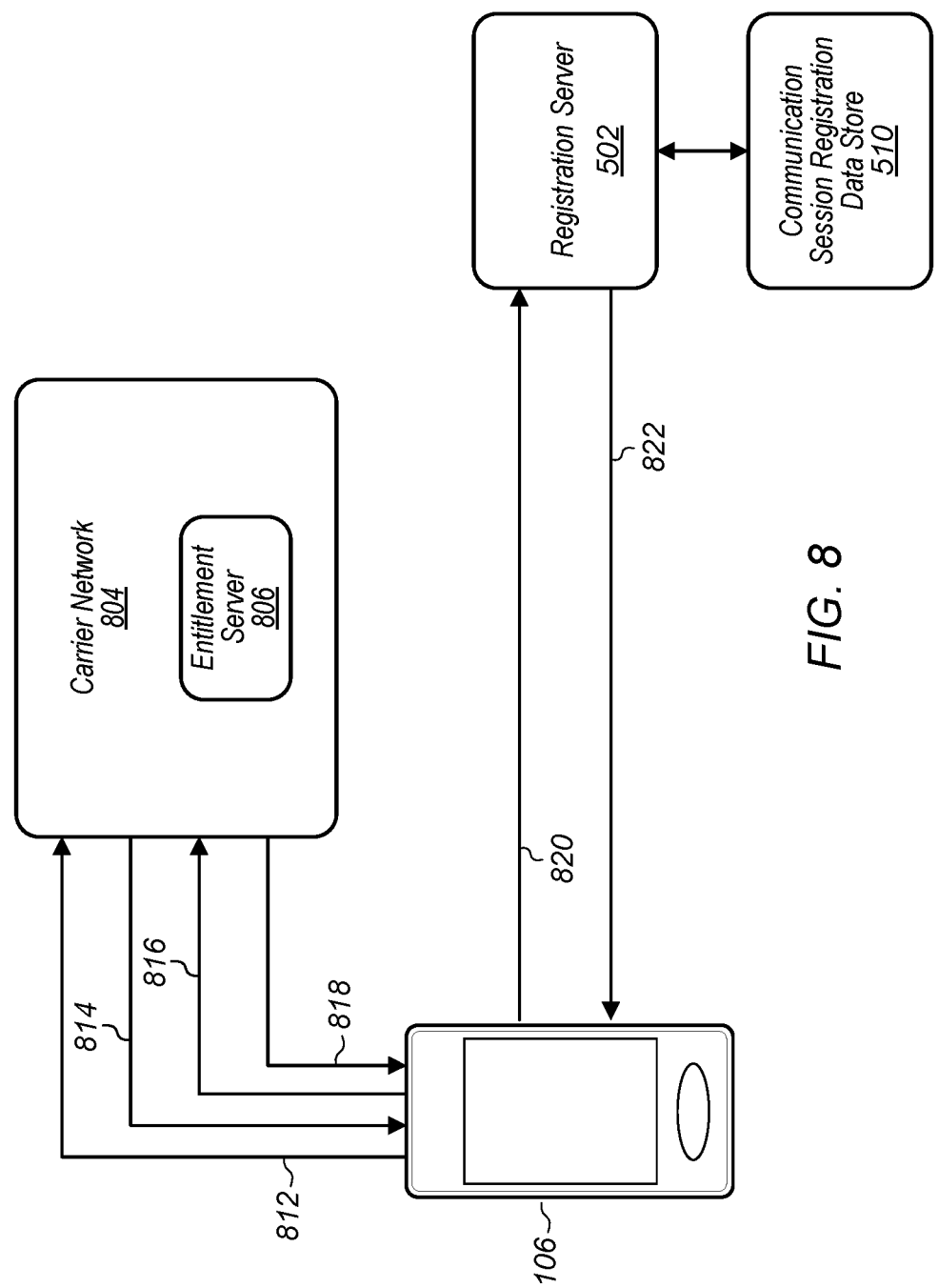
FIG. 8 is a block diagram illustrating an example of a system for automatically registering a UE device with a registration server for online communication sessions, by utilizing an entitlement server, according to some embodiments.

In some scenarios, a carrier network may include an entitlement server configured, inter alia, to provide validation information to a cellular communication device. For example, the entitlement server may provide to the cellular communication device proof that a particular telephone number is assigned to that cellular communication device. The cellular communication device may then provide that proof to the registration server. FIG. 8 illustrates an example of such a scenario.

FIG. 8 illustrates an example of a system and method for automatically performing telephone number validation by utilizing an entitlement server, according to some embodiments.

As shown in FIG. 8, a cellular communication device, such as the UE 106, may be registered with a cellular carrier network 804. The carrier network 804 may include an entitlement server 806. The entitlement server 806 may transmit and receive IP messages to and from the UE 106. The UE 106 may also transmit and receive IP messages to and from a registration server, such as the registration server 502, e.g., via a cellular network, a WLAN, or some other network capable of supporting IP communications.

As shown in FIG. 8, the UE 106 may transmit to the to the entitlement server 806 identification request message 812 (e.g., an IP message), which may include a UE identifier. The UE identifier may uniquely identify the UE 106 and may be based on one or more hardware identifiers (e.g., a serial number of the UE 106, an ICC-ID of a SIM card of the UE 106, etc.). In some embodiments, the identification request message 812 may be addressed to an IP address or a domain name associated with the entitlement server of the carrier network presently serving the UE 106. In some scenarios, the UE 106 may transmit the identification request message 812 partly in response to determining that the carrier network 804 includes the entitlement server 806.

The entitlement server may receive the identification request message 812, and, in response, may validate the SIM card of the UE 106, e.g., using an industry standard EAP-AKA authentication protocol. For example, validation of the SIM card may utilize a "shared secret" embedded within the SIM card of the UE 106 and known to the carrier network 804. In some embodiments, the shared secret may not be transmitted over the network. Instead, the entitlement server 806 may, in response to the identification request message 812, transmit to the UE 106 a challenge message 814 (e.g., an IP message). The challenge message 814 may include a "challenge," which may be passed to the SIM card of the UE 106.

Upon receiving the "challenge," the SIM card may use the "shared secret" to perform cryptographic operations on the "challenge," which may generate a "response." The UE 106 may then transmit the "response" to the entitlement server 806 in response message 816 (e.g., an IP message).

Upon receiving the response message 816, the entitlement server 806 may validate the response by using the "shared secret" to perform the same cryptographic operations as the SIM card, and comparing the result to the "result" received in the result message 816. If the results match, then the data is presumed valid. In response to validating the SIM card of the UE 106, the entitlement server may generate a certificate containing the telephone number assigned to the device. For example, the carrier network 804 may store an association of the telephone number with a SIM of the UE 106. The entitlement server 806 may then transmit the certificate to the UE 106 in identification response message 818 (e.g., an IP message), as "proof" that the telephone number is assigned to the UE 106.

In response to receiving the identification response message 818, the UE 106 may transmit validation request message 820 (e.g., an IP message), which may include the certificate received in the identification response message 818. The validation request message 820 may further include the telephone number, unique identifier of the UE 106, and/or an identifying token of the UE 106. The identifying token may uniquely identify the UE 106 for online communication session messages (e.g., invite request and accept invite messages), and in some embodiments, may be a push token that can contain information that allows a push notification service to locate the UE 106. The identifying token in push notification service embodiments may also be used as a way of establishing trust that a particular notification is legitimate. In other embodiments, any registry or mapping of UEs to unique tokens may be used to associate identifying tokens with UEs and to provide a trusted method of associating the identity of the UE 106 with a uniquely identified token.

In response to receiving the validation request message 820, the registration server 502 may verify the certificate issued by the entitlement server 806. For example, the registration server 502 may verify that the certificate is generated by a trusted authority, and/or that the telephone number is within a range of telephone numbers (e.g., having a correct country code) that the entitlement server 806 is authorized to validate. If the certificate is valid, then the association of the telephone number with the UE 106 is validated.

In other scenarios, telephone number validation may have been requested for some purpose other than registration for online communication sessions. In such scenarios, the registration server 502 may transmit additional communications (e.g., IP messages) to other entities, and/or may store an association between the UE 106 and the telephone number in locations other than (or in addition to) the communication session registration data store 510.

Assuming that the association is validated, the registration server 502 may store an association between the UE 106 (e.g., the identifying token) and the telephone number of the UE 106 in the communication session registration data store 510, e.g., in scenarios in which the UE 106 has requested registration with the registration server 502 for online communication sessions. Such a request may be included, e.g., in the validation request message 820.

In some embodiments, the registration server 502 may transmit a validation status message 822 to the UE 106, indicating to the UE 106 whether validation was successful. In some embodiments, the validation status message 822 may be transmitted only if validation was successful.

As noted above, in some scenarios, telephone number validation may be performed automatically, e.g., as part of a process of telephone number registration, or in response to initiation or configuration of another application, such as an application utilizing an online payment functionality. In such scenarios, the process may be hidden from, or transparent to, the user of the UE 106. For example, in implementing the procedure illustrated in FIG. 8, the UE may transmit and/or receive IP messages such as any of 812-822, without providing any notification to the user.

It should be appreciated that the example embodiment of the registration server 502 illustrated in FIG. 7 may be further configured to accommodate the use of an entitlement server. For example, the client device interface 725 may receive the validation request message 820 from the UE 106, and may transmit the registration status message 822 to the UE 106. The validation module 730 may receive from the client device interface 725 the certificate included in the validation request message 820. The validation module 730 may then determine whether the data is valid. For example, the validation module 730 may determine whether the certificate was generated by a trusted authority, etc.

It should be appreciated that FIG. 8 is merely one example of a system and method for performing telephone number validation using an entitlement server. Additional embodiments and variations are envisioned.

Dynamic Selection of Validation Mechanisms

In some scenarios, transmitting one or more text messages may incur a financial cost (and/or other resource cost) to the operator of the registration server. For example, in embodiments in which telephone number validation is performed utilizing an SMS transit device, e.g., as illustrated in FIG. 5, the operator of the SMS transit device 508 (e.g., the SMS network operator or third-party SMS gateway or SMS aggregator operator) may charge a fee to the operator of the registration server for each SMS message sent and/or received by the SMS transit device 508 as part of a communication between the UE 106 and the registration server 502. Therefore, it may be advantageous for the operator of the registration server to reduce, e.g., minimize, the number of SMS messages sent.

However, in some scenarios, extra SMS messages may occur. For example, delivery of one or more SMS messages between the UE 106 and the SMS transit device 508 may fail, such that the UE 106 does not receive an SMS message from the SMS transit device 508. This may lead to repetition of the entire round-trip SMS-based validation procedure, thus incurring additional SMS costs. As another example, in some scenarios, IP communications to the registration server 502 may be unreliable, e.g., due to network congestion, unreliable internet access at the UE 106, etc. In such scenarios, the UE 106 may transmit the SMS message 512 to the SMS transit device 508, and may receive an SMS message 518 from the SMS transit device 508, as illustrated in FIG. 5. However, when the UE 106 attempts to transmit an IP message, such as the validation request message 520, the message may not be received, due to the unreliable IP communications to the registration server 502. Thus, the round-trip SMS message exchange may be wasted, and may therefore be repeated at a later time, incurring additional costs.

In some scenarios, when utilizing SMS messages to perform telephone number validation, multiple SMS transit devices may be available. For example, a first SMS transit device may be available in many locations, e.g., globally, while a second SMS transit device may be available only in certain geographic regions, or only in certain carrier networks. In some scenarios, the second SMS transit device may provide preferable service, e.g., because the second SMS transit device charges a lower fee per SMS message, or provides faster or more reliable service.

In some scenarios, the number of text messages exchanged during telephone number validation may be lowered, or eliminated, by utilizing an entitlement server, e.g., as illustrated in FIG. 8. However, some carrier networks do not include an entitlement server. Additionally, where a carrier network does include an entitlement server, the entitlement server may, on occasion, be unavailable, e.g., due to system errors, maintenance, etc. In such scenarios, telephone number validation with the registration server 502 may require utilizing another validation mechanism, such as utilizing SMS messages, e.g., as illustrated in FIG. 5.

Figure 9:
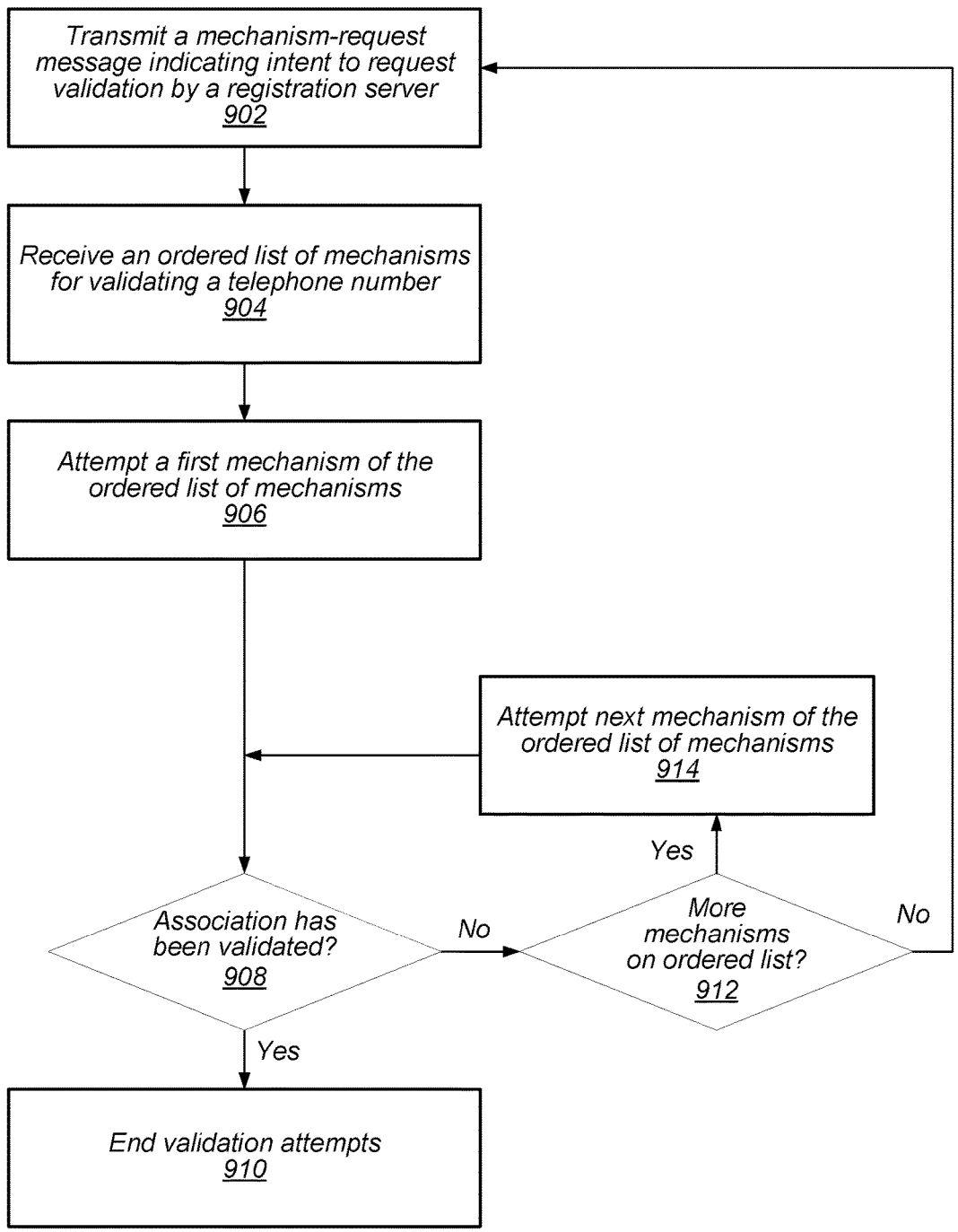
FIG. 9 is a flow diagram illustrating an example operation of a UE device participating in validation of an association of a telephone number with the UE device by a registration server, according to some embodiments.
Figure 10:
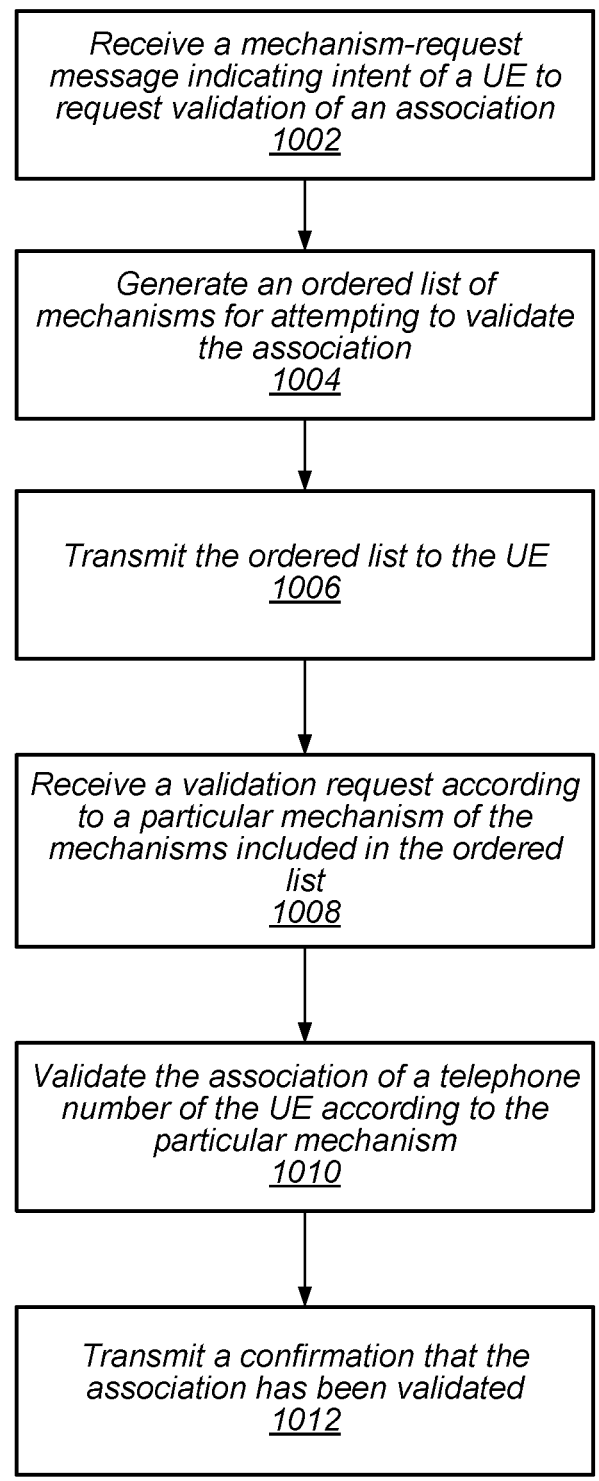
FIG. 10 is a flow diagram illustrating an example operation of a registration server validating an association of a telephone number with a UE device, according to some embodiments.

Because of this variety of scenarios that may be encountered during telephone number validation, it would be advantageous for the UE 106 to dynamically select which telephone number validation mechanism(s) to use, e.g., to reduce cost to the operator of the registration server 502, to improve efficiency of validation, etc. FIG. 9 is a flow diagram illustrating an example of operation of a UE performing such selection as part of the process of performing telephone number validation with a registration server, according to some embodiments. Similarly, FIG. 10 is a flow diagram paralleling FIG. 9, and illustrating an example of operation of a registration server assisting such selection as part of the process of telephone number registration for the UE, according to some embodiments. The two figures are therefore explained together.

At 902 of FIG. 9, a cellular communication device, such as the UE 106, may transmit a mechanism-request message (e.g., an IP message) indicating an intent to request validation of an association of a telephone number with the UE 106 by a registration server, such as the registration server 502, e.g., as part of a registration process for an online communication session. In some scenarios, the mechanism-request message may include various information regarding the state of the UE 106, the carrier network of the UE 106, and/or one or more communication networks currently serving the UE 106. For example, the mechanism-request message may include any/all of identification of the carrier network (e.g., a PLMN field) and/or one or more serving networks, an indication of whether an entitlement server is available in the carrier network, performance information regarding communications between the UE 106 and the one or more serving networks (e.g., signal quality, information regarding failed SMS attempts), a geographic region of the UE 106, a specific location of the UE 106, roaming status of the UE 106, and/or information regarding previous attempts by the UE 106 to register with the registration server 502. As shown at 1002 of FIG. 10, the registration server 502 may receive the mechanism-request message.

In response to receiving the mechanism-request message, the registration server 502 may, at 1004, generate an ordered list of mechanisms for attempting to validate a telephone number of the UE 106. The ordered list of mechanisms may specify any of the mechanisms for performing telephone number validation discussed above, as well as any other available mechanisms for performing telephone number validation.

For example, one or more of the mechanisms specified by the ordered list may include validating a telephone number of the UE 106 by verifying that the SMS network serving the UE 106 delivers to the UE 106 an SMS message addressed to the telephone number, e.g., according to the method illustrated in FIG. 5. In some scenarios, one or more such mechanisms may include routing the SMS message via a particular SMS transit device, such as the SMS transit device 508. In some scenarios, more than one SMS transit device may be available, in which case the ordered list of mechanisms may specify a first mechanism including routing the SMS message via a first SMS transit device, a second mechanism including routing the SMS message via a second SMS transit device, etc. The availability of such various SMS transit devices may be determined or estimated by the registration server 502, e.g., based in part on any/all of location information of the UE 106, identity of a serving network of the UE 106, and/or other information included in the mechanism-request message.

As another example, one or more of the mechanisms specified by the ordered list may include validating the telephone number of the UE 106 using an entitlement server, e.g., according to the method illustrated in FIG. 8.

At 1006, the registration server may transmit a mechanism-list message (e.g., an IP message) including the ordered list to the UE 106, and the UE 106 may receive the mechanism-list message at 904. According to some embodiments, the registration server 502 may be configured as illustrated in FIG. 7. In such scenarios, the ordered list may be generated by the list generator 750, which may then pass the ordered list to the client device interface 725, to be transmitted to the UE 106.

In response to receiving the ordered list, the UE 106 may, at 906, attempt a first mechanism of the ordered list of mechanisms. Specifically, the first mechanism may be the mechanism occurring first in the ordered list. Attempting the first mechanism may include performing some or all of the steps to be performed by the UE 106 in performing telephone number validation with the registration server 502, e.g., as illustrated in FIG. 5 or FIG. 8.

After attempting the first mechanism, the UE 106 may determine, at 908, whether the association of the telephone number with the UE 106 has been successfully validated, e.g., by the registration server 502. For example, the UE 106 may determine that validation has been successful if it receives from the registration server 502 a validation status message (such as the validation status message 522 or the validation status message 822) indicating successful registration. Similarly, the UE 106 may determine that validation has not been successful if it receives from the registration server 502 a validation status message indicating failure. Alternatively, the UE 106 may determine that validation has not been successful if the UE 106 determines that it has not, within a predetermined time after attempting the first mechanism, received any confirmation (such as a validation status message) that the association has been validated by the registration server. As another example, the UE 106 may determine that validation has not been successful if it detects that an intermediate step of the mechanism has failed. For example, if the first mechanism includes the procedure illustrated in FIG. 5, then the UE 106 may determine that validation has not been successful if it fails to receive the SMS message 518 within a predetermined period of time after transmitting the SMS message 512, or if the UE 106 determines that delivery of the SMS message 512 has failed.

In response to determining, at 908, that the association has been successfully validated by the registration server 502, the UE 106 may, at 910, stop attempting validation, ending the method of FIG. 9.

In response to determining, at 908, that the association has not been successfully validated, the UE 106 may determine, at 912, whether one or more additional mechanisms are present in the ordered list of mechanisms. If one or more mechanisms are present, then the UE 106 may, at 914, attempt the next mechanism of the ordered list. For example, after unsuccessfully attempting the first mechanism, the UE 106 may attempt a second mechanism—specifically, the mechanism occurring second in the ordered list. The UE 106 may then again determine, at 908, whether the association has been successfully validated by the registration server 502. The UE 106 may continue this process until validation is successful or no additional mechanisms remain on the ordered list. Optionally, in some implementations, the UE 106 may repeat an attempt using a mechanism specified in the ordered list before attempting another mechanism specified in the ordered list.

In response to determining, at 912, that no additional mechanisms remain on the ordered list, the UE 106 may return to 902, and transmit a new (e.g., a updated) mechanism-request message indicating an intent to request validation by the registration server 502. In some scenarios, the new mechanism-request message may be similar in form to the first mechanism-request message, but may include different data. For example, the new mechanism-request message may include updated information regarding any/all of performance information of the one or more serving networks, specific location of the UE 106, information regarding previous attempts by the UE 106 to register with the registration server 502, etc.

At 1008, the registration server 502 may receive a validation request according to a particular mechanism of the mechanisms included in the ordered list. In some scenarios, the validation request may be according to the first mechanism. However, in other scenarios, an attempt by the UE 106 to request validation according to the first mechanism may have failed prior to the registration server 502 receiving a validation request. Thus, the registration server 502 may receive a validation request according to a particular mechanism other than the first mechanism.

The validation request may be any request initiating involvement by the registration server 502 in the validation mechanism being attempted by the UE 106. For example, the validation request may be one of the identification request message 514 or the validation request message 820.

In response to receiving the validation request, the registration server 502 may, at 1010, validate the association of the telephone number with the UE 106 according to the particular mechanism. For example, at 1010, the registration server 502 may perform steps for performing telephone number registration as illustrated with regard to either of FIG. 5 or FIG. 8, or according to some other mechanism.

In response to validating the association, the registration server 502 may transmit to the UE 106 a confirmation that the association has been validated. For example, the registration server 502 may transmit a validation status message (such as the validation status message 522 or the validation status message 822) indicating successful registration.

In scenarios in which the UE 106 has requested registration for online communication sessions, the registration server may, in response to validating the association, register the UE 106 for online communication sessions. Registration may include storing information associating the telephone number with the UE 106, e.g., as discussed above with regard to FIGS. 5-8. In other scenarios, in which telephone number validation was requested for some purpose other than registration for online communication sessions, the registration server 502 may transmit additional communications to other entities, and/or may store an association between the UE 106 and the telephone number in locations other than (or in addition to) the communication session registration data store 510.

It should be appreciated that the UE 106 may delay attempting any mechanism for validating the association until after receiving the ordered list. Specifically, failure to receive the ordered list following transmission of the mechanism-request message may indicate a communication failure between the UE 106 and the registration server 502, or other error. In this case, transmission of other communications between the UE 106 and the registration server 502 (e.g., the validation request message 520 or 820 or the validation status message 522 or 822) would also be likely to fail, resulting in any preceding messages involved in the mechanism (e.g., the SMS messages 512 and 518) being wasted. In some scenarios, if the UE 106 does not receive the ordered list within a predetermined period of time following transmission of the mechanism-request message, the UE 106 may retransmit the mechanism-request message. In some scenarios, the UE 106 may continue to periodically retransmit the mechanism-request message (or updated versions of the mechanism-request message) until the ordered list is received. In some scenarios, the UE 106 may stop retransmitting the mechanism-request message (at least temporarily) if the ordered list is not received within a maximum number of attempts.

In some scenarios, the registration server 502 may, e.g., in response to receiving the mechanism-request message, transmit an instruction to the UE 106 to stop retransmitting the mechanism-request message, or to wait for a specified period of time before retransmitting the mechanism-request message. For example, the UE 106 may repeatedly transmit the mechanism-request message, even though telephone number validation has been successfully completed, or where some system error may prevent telephone number validation from being completed. For example, if the UE 106 fails to receive or properly recognize validation status messages, then the UE 106 may fail to realize that validation was successful. This may cause the UE 106 to repeatedly transmit the mechanism-request message requesting a new ordered list of validation mechanisms. Furthermore, this may cause the UE 106 to repeatedly attempt all of the mechanisms include in the ordered list, which may incur unnecessary expense, such as extra SMS charges. Thus, if the registration server 502 observes such repeated mechanism-request messages, e.g., at a high rate of repetition or despite successful validation, then the registration server 502 may respond to a mechanism-request message by transmitting the instruction to the UE 106 to stop retransmitting the mechanism-request message, or to wait for a specified period of time before retransmitting the mechanism-request message. It should be appreciated that this may stop or delay execution of the methods of FIG. 9 (e.g., at 902) and FIG. 10 (at 1002)

It should be appreciated that effectively generating the ordered list of mechanisms for attempting to validate the association of the telephone number to the UE 106 may be significant to the success and efficiency of validation. In generating the ordered list of mechanisms, the registration server 502 may first determine what mechanisms are available for telephone number validation. For example, the registration server 502 may determine an SMS network currently serving the UE 106, and whether the SMS network includes one or more SMS transit devices. The registration server 502 may further determine a carrier network of the UE 106, and whether the carrier network includes an entitlement server. The registration server 502 may further determine performance metrics (e.g., current or recent performance metrics) of the serving SMS network and/or the carrier network, or components thereof, such as the entitlement server or the one or more SMS transit devices. In some scenarios, the registration server 502 may determine some or all of this information based on data included in the mechanism-request message, or by requesting information from the serving SMS network and/or the carrier network. In some scenarios, the registration server 502 may store historical data for use in determining performance metrics or other relevant information. For example, the registration server 502 may store information relating to success rates of communicating with various SMS transit devices and/or entitlement servers over a period of time (e.g., the previous 24 hours).

In generating the ordered list of mechanisms, the registration server 502 may order the available mechanisms in such a way as to pursue any of a variety of goals. Specifically, the mechanisms specified in the ordered list may be arranged according to an order of preference for accomplishing one or more goals in the process of telephone number validation. One example goal may include seeking to reduce or minimize the cost of validation to an operator of the registration server 502. For example, in some instances, the ordered list of mechanisms may include only a single mechanism including using an entitlement server, e.g., as illustrated in FIG. 8. This mechanism may incur no SMS fees, and may therefore be the least expensive mechanism for the operator of the registration server 502. As another example, the ordered list may include a plurality of mechanisms, arranged according to an order of increasing cost. For example, the ordered list may include a first mechanism using an entitlement server, e.g., as illustrated in FIG. 8; a second mechanism using an SMS message addressed to the telephone number, e.g., according to the method illustrated in FIG. 5, and further specifying that the SMS communications be conducted via a first (less expensive) SMS transit device; and a third mechanism also using an SMS message addressed to the telephone number, and further specifying that the SMS communications be conducted via a second (more expensive) SMS transit device. In some scenarios, mechanisms that include SMS messages may be shifted downward on the ordered list, or removed from the ordered list, if the registration server 502 determines that additional SMS charges may be incurred for the operator of the registration server 502 or the user, e.g., based on the roaming status of the UE 106. In some embodiments, the registration server 502 may assign a score to each of one or more available mechanisms based on likely cost, and may order available mechanisms according to their respective scores. In such embodiments, scores may be assigned or adjusted, e.g., based on any of the factors described above.

Another possible goal may include seeking to improve the efficiency and/or likelihood of success of validation. For example, the ordered list of mechanisms may include one or more of the available mechanisms in order of decreasing likelihood of successful registration. The registration server 502 may determine or estimate likelihood of successful validation, e.g., based on performance metrics, historical data, or other information, as discussed above. For example, if historical data indicates that attempts by the UE 106 or other UEs to perform telephone number validation with the registration server 502 using the entitlement server of the carrier network of the UE 106 have repeatedly failed, e.g., during a recent window of time of predetermined length, then the registration server 502 may order a mechanism utilizing the entitlement server lower on the ordered list. Similarly, if historical data indicates that a particular SMS transit device has experienced a low success rate in receiving and/or delivering SMS messages, e.g., during a recent window of time of predetermined length, then the registration server 502 may order a mechanism utilizing that SMS transit device lower on the ordered list. Similarly, if performance metrics indicate that the UE 106 currently has a poor connection with the SMS network currently serving the UE 106, then the registration server 502 may order all mechanisms utilizing SMS messages lower on the ordered list, regardless of the SMS transit device used. In some embodiments, the registration server 502 may assign a score to each of one or more available mechanisms based on likelihood of successful registration, and may order available mechanisms according to their respective scores. In such embodiments, scores may be assigned or adjusted, e.g., based on any of the factors described above.

Another possible goal may seek to balance the preceding considerations. For example, the registration server 502 may order available mechanisms according to increasing cost to the operator of the registration server 502, but one or more mechanisms may be shifted downward on the list, or removed from the list, if the one or more mechanisms fail to meet a threshold likelihood of successful registration. Alternatively, the registration server 502 may assign a score to each of one or more available mechanisms, based on both likely cost and likelihood of success, and may order available mechanisms according to their respective scores. In some embodiments, a relative weighting may be applied between the cost and success factors to adjust for relative importance to the registration server 502 operator.

The goal to be pursued in generating the ordered list of mechanisms, as well as the parameters used in generating the ordered list, may be determined by an operator of the registration server 502, and may, in some scenarios, be dynamically adjusted.

It should be appreciated from an understanding of FIG. 9 that the method illustrated by FIG. 10 may be interrupted at any of various points. For example, if the UE 106 fails to successfully validate the association according to any of the mechanisms included in the ordered list of mechanisms, then the UE 106 may send a new (e.g., updated) mechanism-request message. This may correspondingly reset the method of FIGS. 10 to 1002. In such scenarios, the registration server may generate a new ordered list of mechanisms to be transmitted in a subsequent instance of 904, which may be different from the previous list, e.g., because of updated information included in the new mechanism-request message.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or any one or more of the servers or systems illustrated in any of the figures) may be configured to include one or more processors and a memory medium, where the memory medium stores program instructions, where the one or more processors are configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for selecting a validation mechanism for association of a telephone number with a user equipment (UE) device, the method comprising:
   by the UE:
   transmitting a mechanism-request message comprising an indication that the UE will request validation of the association by a registration server;
   receiving, responsive to the mechanism-request message, an ordered list of mechanisms for validating the association;
   selecting a first mechanism of the ordered list of mechanisms, based on the list order; and
   attempting the first mechanism of the ordered list of mechanisms, wherein the UE delays attempting any mechanism for validating the association until after receiving the ordered list.

2. The method of claim 1, further comprising:
   requesting registration of the UE with the registration server for participation in an online communication session; and
   receiving from the registration server a confirmation that the UE has been registered with the registration server.

3. The method of claim 1, further comprising:
   receiving from the registration server a confirmation that the association has been validated by the registration server.

4. The method of claim 1, further comprising:
   determining that validation of the association according to the first mechanism has failed; and
   attempting a second mechanism of the ordered list of mechanisms in response to the determining.

5. The method of claim 4, wherein determining that validation of the association according to the first mechanism has failed comprises:
   determining that the UE has not received a confirmation that the association has been validated within a predetermined time after attempting the first mechanism.

6. The method of claim 4, further comprising:
   attempting each mechanism of the ordered list of mechanisms;
   determining that validation of the association has failed for each mechanism of the ordered list of mechanisms;
   in response to determining that validation has failed, transmitting an updated mechanism-request message comprising an indication that the UE will request validation of the association by the registration server; and
   receiving, responsive to the updated mechanism-request message, an updated ordered list of mechanisms for validating the association.

7. The method of claim 1, further comprising:
   retransmitting the mechanism-request message responsive to determining that the ordered list has not been received within a predetermined duration after transmitting the mechanism-request message.

8. The method of claim 1, wherein the first mechanism comprises using an entitlement server to validate a telephone number associated with the UE.

9. The method of claim 1, wherein the first mechanism comprises validating a telephone number associated with the UE by verifying that a short message service (SMS) network serving the UE delivers to the UE an SMS message addressed to the telephone number.

10. The method of claim 9, wherein the first mechanism further comprises routing the SMS message via a particular SMS transit device of a plurality of available SMS transit devices.

11. A method for validating an association of a telephone number with a user equipment (UE) device by a registration server, the method comprising:
    by the registration server:
    receiving from the UE a mechanism-request message comprising an indication that the UE will request validation of the association by the registration server;
    generating, in response to receiving the mechanism-request message, an ordered list of mechanisms for the UE to use in attempting to validate the association, wherein generating the ordered list of mechanisms comprises ordering an available mechanism with a higher likelihood of successful validation ahead of an available mechanism with a lower likelihood of successful validation;
    transmitting the ordered list to the UE;
    receiving from the UE a validation request according to a particular mechanism of the mechanisms included on the ordered list;
    validating the association of the telephone number with the UE according to the particular mechanism in response to receiving the validation request; and
    transmitting to the UE a confirmation that the association has been validated.

12. The method of claim 11, further comprising:
    registering the UE, in response to validating the association, for participation in an online communication session, wherein registering the UE comprises storing information associating the telephone number with the UE.

13. The method of claim 11, wherein the particular mechanism comprises validating the telephone number of the UE using an entitlement server.

14. The method of claim 11, wherein the particular mechanism comprises validating the telephone number of the UE by verifying that a short message service (SMS) network serving the UE delivers to the UE an SMS message addressed to the telephone number.

15. The method of claim 14, wherein the particular mechanism further comprises routing the SMS message via a particular SMS transit device of a plurality of available SMS transit devices.

16. The method of claim 11, wherein generating the ordered list of mechanisms for attempting to register the UE comprises determining two or more available mechanisms.

17. The method of claim 11, wherein generating the ordered list of mechanisms comprises ordering an available lower cost mechanism ahead of an available higher cost mechanism.

18. The method of claim 11, wherein generating the ordered list of mechanisms comprises ordering available mechanisms in an order considering cost to an operator of the registration server and a likelihood of successful validation.

19. A cellular communication device, comprising:
- at least one memory medium storing program instructions;
- at least one processing element configured to execute the program instructions to cause the cellular communication device to:
  - transmit a mechanism-request message comprising an indication that the cellular communication device will request, from a registration server, validation that a particular telephone number has been assigned to the cellular communication device;
  - receive, responsive to the mechanism-request message, an ordered list of mechanisms for validating that the telephone number has been assigned to the cellular communication device;
  - select a first mechanism of the ordered list of mechanisms, based on the list order; and
  - attempt the first mechanism of the ordered list of mechanisms, wherein the cellular communication device delays attempting any mechanism for validating that the telephone number has been assigned to the cellular communication device until after receiving the ordered list.

* * * * *